United States Patent [19]  [11] 3,957,412
Lechevallier  [45] May 18, 1976

[54] CUPPING MACHINE FOR PRODUCING CONTAINERS IN THERMOPLASTIC FILM AND COMPRISING A DEVICE FOR PLACING A TAPE-LIKE STRIP IN A MOLD

[75] Inventor: Raymond Lechevallier, Potigny, France

[73] Assignee: Ste. D'Application Plastique, Mecanique et Electronique Plastimecanique, Courbevoie, France

[22] Filed: Dec. 11, 1974

[21] Appl. No.: 531,685

[30] Foreign Application Priority Data
Dec. 19, 1973 Germany............................ 2363020

[52] U.S. Cl............................. 425/296; 425/126 R; 425/324 R; 425/450.1; 425/455 R; 425/383; 425/327
[51] Int. Cl.².......................................... B29C 3/00
[58] Field of Search................ 425/296, 324 R, 383, 425/450.1, 455, 129, 126 R, 327

[56] References Cited
UNITED STATES PATENTS
3,684,418  8/1972  Langecker...................... 425/126 X
3,709,643  1/1973  Nasica........................... 425/324 X
3,780,559  12/1973 Turner............................... 425/129

Primary Examiner—Robert L. Spicer, Jr.
Attorney, Agent, or Firm—Parmelee, Miller, Welsh & Kratz

[57] ABSTRACT

The present invention concerns a cupping machine for producing containers in thermoplastic film and comprising a device for placing a tape-like strip in a mold, in the frame of which machine are disposed a holder for a roll of thermoplastic film, means for moving this film, a heating device and a shaping apparatus which comprises at least one row of molds, which are displaceable at right angles to the plane of the film, extend over the entire width of the film, and, after the film has been heated, are pressed towards a male half having first-stage shaping mandrels and disposed on the other side of the film, the containers being finally formed by means of a pressure media and, at the same time, the tape-like strips, brought into the molds, being sealed onto the container, in which machine there are provided devices for introducing the tape-like strip directly into the molds.

10 Claims, 7 Drawing Figures

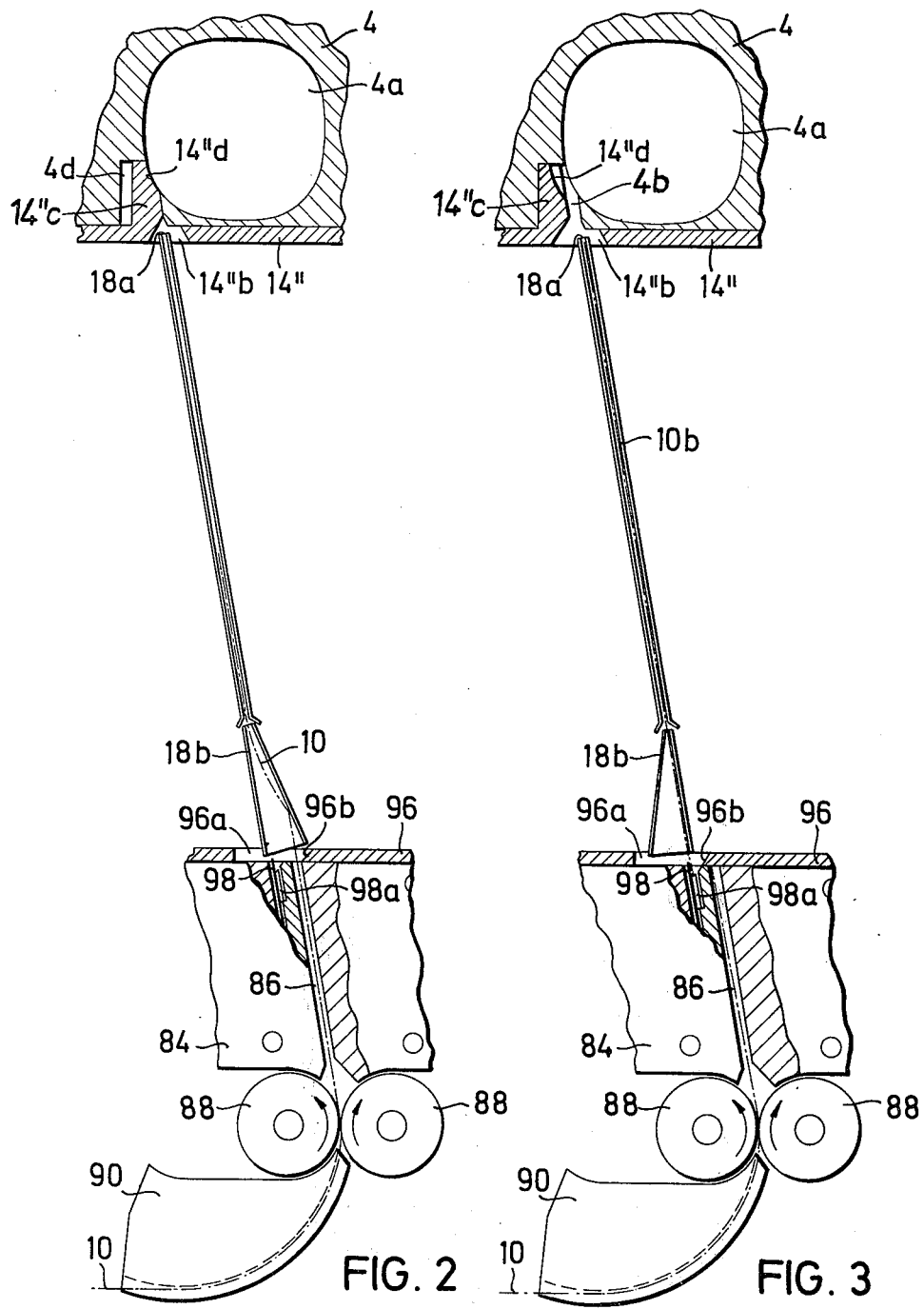

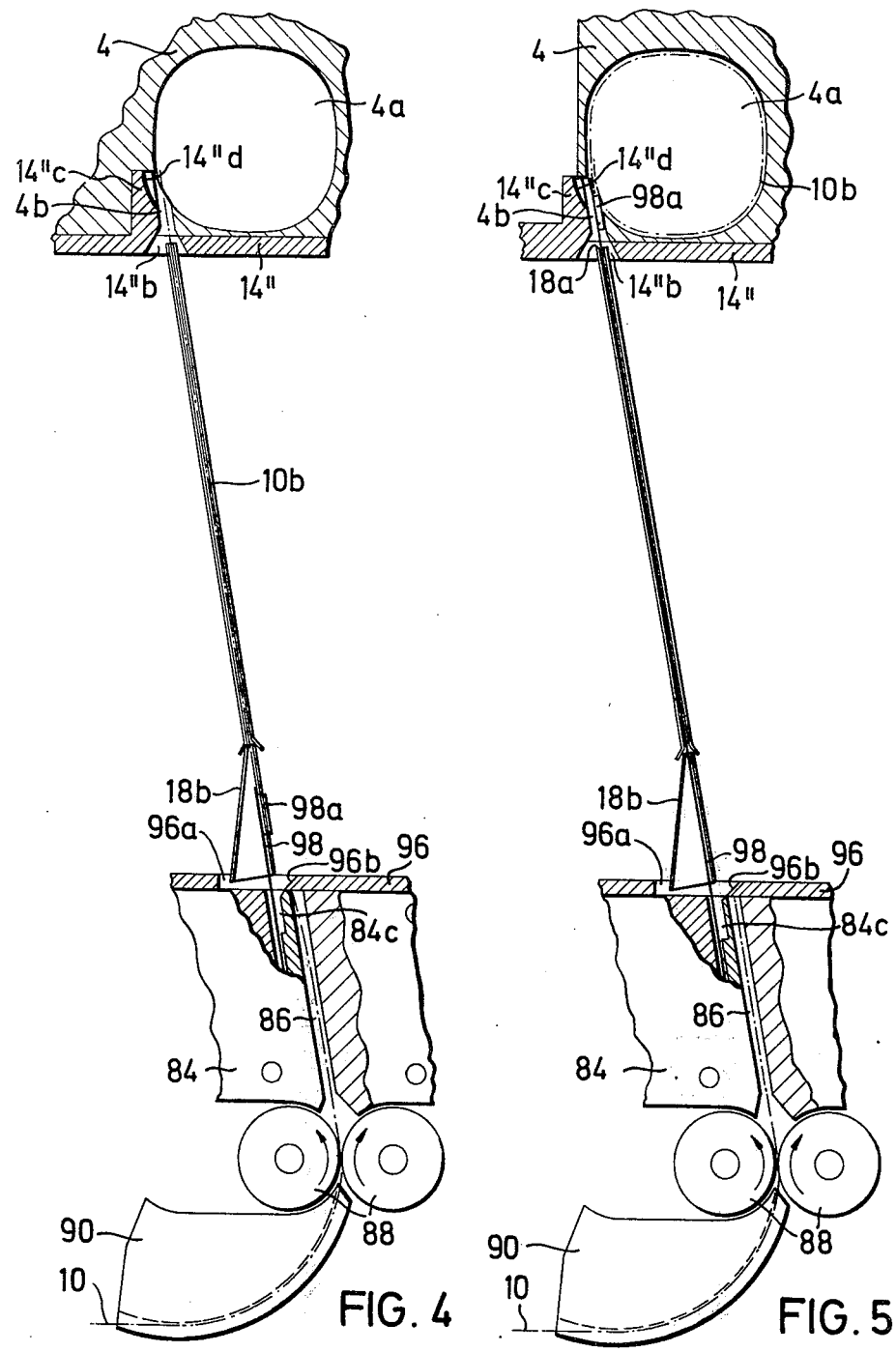

CUPPING MACHINE FOR PRODUCING CONTAINERS IN THERMOPLASTIC FILM AND COMPRISING A DEVICE FOR PLACING A TAPE-LIKE STRIP IN A MOLD

BACKGROUND OF THE INVENTION

Machines of the type contemplated are disclosed in copending U.S. patent application Ser. No. 467,637, now abandoned, filed May 7, 1974 by Jean-Marc Dronet and assigned to the assignee of the present invention, the disclosure of said patent application being included herein by reference. A complete disclosure of a machine of this type is made in U.S. Pat. No. 3,000,157 and U.S. Pat. No. 3,904,305, both of which are assigned to the assignee of the present invention.

According to the teaching of said patent application, the tape-like strip is drawn from a roll and, via idling guide rollers, introduced into guiding channels from where they arrive immediately at the individual molds. The strip portion in the mold is then cut off by means forming part of the mold itself.

It has been found that, in order to achieve a maximum operation sequence of the machine, the introduction of the strip into the molds during the extremely short interval within which the shaping apparatus is in its lowermost position, extremely great accelerations of the strip including its length up to the storage roll will be necessary, the resulting forces eventually resulting in fracturing of the strip. It is, therefore, the object of the present invention to provide the machine with means to introduce a tape-like strip into the mold such that the drawback mentioned above will be avoided. It is a further object of the invention to provide a machine of this type in which the drawing of the tape-like strip from the storage roll and the introduction thereof into the mold will take place as two operations separated in time and/or space, as the case may be.

SUMMARY OF THE INVENTION

According to the invention, in a machine of the type described above predetermined lengths of the tape-like strip will be disposed in receiving means in front of the inlet openings of the shaping apparatus, conveying means being provided to transport said lengths of strip individually and in synchronism into the mold. In this way the lengths of tape-like strip may be introduced into the molds without the necessity to accelerate the entire strip up to the storage roll.

It is thus possible to inject the cut-off lengths of strip into the hollow molds without acceleration of the entire strip including the storage roll.

In a first embodiment, the conveying means may comprise synchronized pushers engaging the trailing edge of the cut-off strip lengths and injecting them into the hollow molds through tangential slots which may be opened and closed, respectively. In another embodiment, the conveying means may comprise pairs of synchronized driven rollers one of which being disposed in substantially tangential relation with respect to the inner mold wall, said one roller being provided with means to engage the strips for completely introducing them into the mold.

It is to be noted that in each embodiment, the conveying means must be such that the cut-off lengths of strip will be gripped individually and will be injected completely into the mold. The strips may be taken drawn from a storage roll mounted in front of guide channels which open adjacent the mold slots, cutting means being provided on the rear end of said channels to feed each channel with a predetermined length of strip cut-off from said storage roll strip.

An important advantage of the invention is the fact that the feeding of the intermediate storage means, preferably the guide channel, with the length of strip for the next operation, may be implemented during the time interval of the machine cycle in which the molds are not accessible for introduction of the strip itself, the very strip injection occurring during a very short fraction of the entire cycle period. The time interval thus available for drawing the strip from its storage roll, cutting off and introducing the cut-off length in the intermediate storage means will be substantially longer than in the case where these operations were to be provided simultaneously with the injection of the strip into the mold itself. Consequently, the strip need not be subjected to extreme accelerations resulting in the forces being reduced to a tolerable minimum.

BRIEF DESCRIPTION OF THE DRAWINGS

FIG. 2 is an illustration similar to FIG. 1 where the strip is partly introduced into a guide channel;

FIG. 3 is an illustration similar to FIG. 1 where a cut-off strip length is introduced into the guide channel;

FIG. 4 is an illustration similar to FIG. 1 showing the beginning of the introduction of the cut-off strip into the mold;

FIG. 5 is an illustration similar to FIG. 1 showing the strip completely introduced into the mold;

DESCRIPTION OF THE EMBODIMENTS

In FIGS. 1–5 the first embodiment of the invention is illustrated and the drawings show those parts of the entire machine which are modified in accordance with the teaching of the invention.

Figure 1:
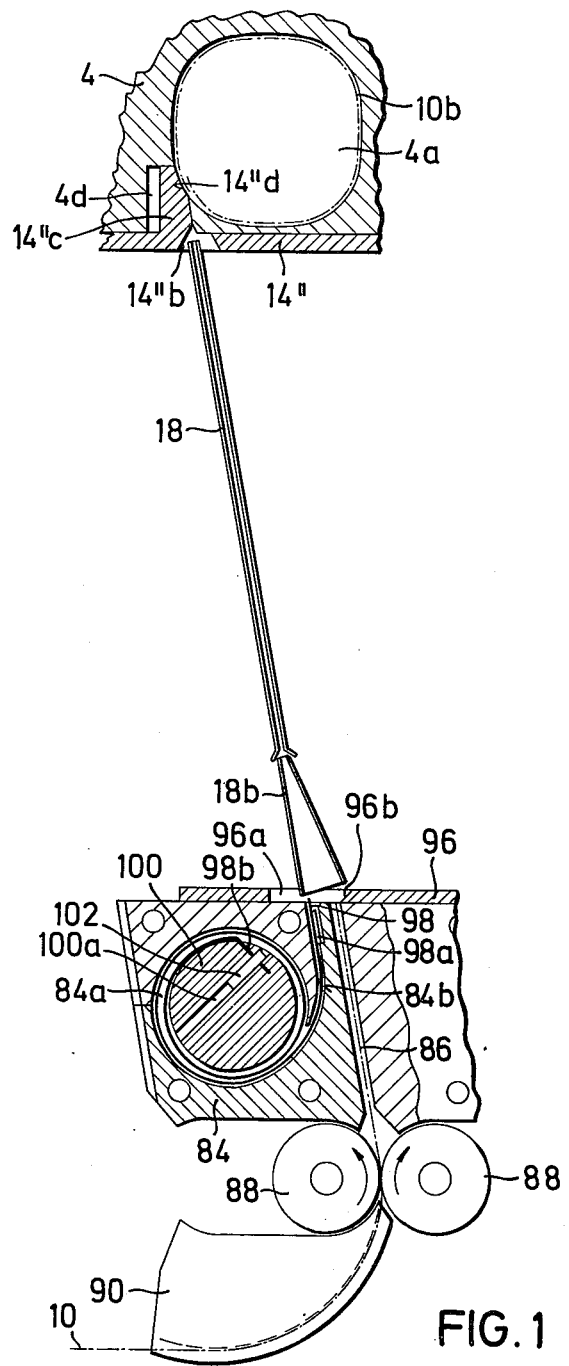
FIG. 1 shows in part a plan view partly in section of the strip introducing apparatus and of the shaping apparatus at the cupping machine according to the invention.

The vertically reciprocable shaping apparatus 4 comprises hollow molds 4a into which the cut-off tape-like strips 10b are to be introduced such that they engage the lateral wall of the hollow mold 4a whereafter the heated thermoplastic film is formed into said mold. In order to permit introduction of the lengths of tape-like strips 10b into molds 4a, closeable tangential slots 4b are provided (FIGS. 4 and 5) which are opened upon movement of slider 14″. In FIG. 1, said introduction slots 4b are closed because of the slider 14″ having been moved to the right hand (in the drawings) by means of a suitable drive means so that the closure members 14″c integral with slider 14″ are shifted in complementary recesses 4d to the right hand, too, the hollow molds 4a being closed thereby, and 14″d of said closure member completing the contour of the hollow mold.

Guide channels 18 extend with their opening 18a into funnel shaped openings 14″b of sliders 14″. The guide channels 18 receive and guide the tape-like strips 10 after the latter have been drawn from the storage roll, not shown, and they guide the lengths of tape-like strip 10b during their introduction into hollow molds 4a.

Between guide channels 18 and cutting apparatus for strip 10 mounted at frame 84 movable funnel type guide elements 18b are provided which serve to guide the tape-like strips 10 into channels 18 and to present the rear ends of the cut-off strips 10b in front of the injectors having the form of a leaf-spring 98 which is to be explained in detail hereunder. The cutting device at frame 84 is a reciprocable blade 96 having openings 96a permitting passage of strips 10 and provided with cutting edges 96b cooperating with complementary edges at frame 84. In frame 84 there are provided slots 86 through which the tape-like strips 10 are passed by means of transport rollers 88. Parallel thereto cylindrical cavities 84a are provided receiving each a mandrel 100. The rear ends 98b of the leafsprings are fastened at said mandrels 100 by means of pins 102 and wound thereafter about said mandrels so that the free ends 98a which are somewhat thicker than the remainder of the spring are housed in counter recesses 84c and the opening of slots 84b which provide the tangential transition to said cylindrical cavities 84a for the leafsprings 98. In front of transport rollers 88 guide elements 90 are provided which orient the tape-like strips 10 in such a manner that they do not contact each other.

OPERATION (EMBODIMENT 1)

The apparatus described so far operates as follows: In position according to FIG. 1, a cut-off length of tape-like strip 10b has been introduced into the hollow mold 4a and the leafspring 98 has been retracted from guide channel 18 due to its being wound about mandrel 100. By shifting of slider 14″ hollow mold 4a has been closed so that the shaping apparatus 4 may now be brought into its upper position in order to implement a forming operation of the heated thermoplastic film. Simultaneously, the cutting device (blade 96) has been shifted to the right, too, taking with it movable funnel-like guide element 18b so that slot 86 has been opened and the funnel-like guide element 18b being located in front of said slot 86. Now, a tape-like strip 10 is caused to be introduced into guide channel 18 by means of the transport rollers 88, a predetermined length 10b of the tape-like strip being drawn from the storage roll, not shown. Thereafter, as shown in FIG. 3, the cutting apparatus is actuated by moving blade 96 to the left. Simultaneously, the funnel-like guide element 18b is moved to the left, too, so that the rear end of the cut-off tape-like strip 10b is presented in front of the thickened leading end 98a of leafspring 98. In the meantime, shaping apparatus 4 has returned into its lower position, movable slider 14″ is moved to the left and with it the closure member 14″c so that beyond the opening 14″b of movable slider 14″ a tangential introduction slot 4b is opened. At the same instant, mandrel 100 is rotated by means of a suitable driven means (not shown), so that the leafspring 98 is unwound and enters via funnel-like guide element 18b guide channel 18, pushing in front of this the cut-off length of tape-like strip 10b. In the position of FIG. 5, the injection of this tape-like strip 10b has been terminated and immediately thereafter the leafspring is retracted and returns to the position shown in FIG. 1 so that the operation described so far may be repeated.

It will be understood that the preparation of the cut-off tape-like strip 10b and its injection into the hollow molds 4a occurs in two separate phases succeeding each other in such a manner that just the injection of the cut-off length of strip into the hollow mold is to be implemented during the relatively short time interval during which the shaping apparatus 4 is in its lowermost position. In contrast thereto, the introduction of the tape-like strip 10 into guide channel 18 and the cutting off thereof to a predetermined length may occur during the entire remaining time interval during which the shaping apparatus 4 moves to its uppermost position, remains therein, and returns to its lowermost position.

Figures 6, 7:
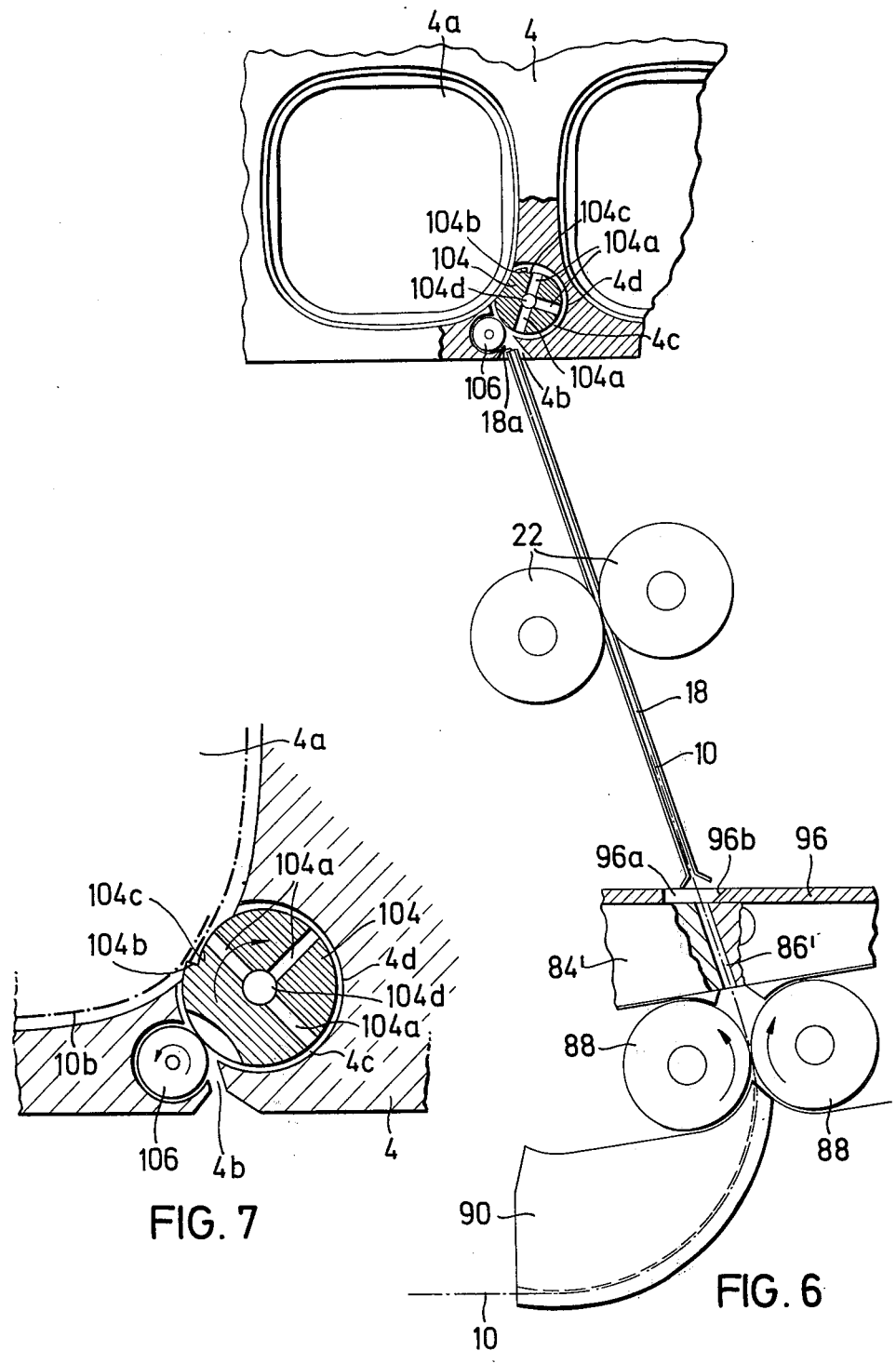
FIG. 6 refers to a second embodiment of the machine according to the invention, it shows in a plan view partly in section a strip introducing apparatus and a shaping apparatus at a cupping machine.
FIG. 7 is an illustration similar to FIG. 6 showing the termination of the introduction of the cut-off strip into the mold.

The same considerations apply for the embodiment shown in FIGS. 6 and 7. According thereto, a frame 84′ is provided with a cutting device consisting of a reciprocable blade 96 provided with passages 96a for the tape-like strip 10 and with cutting edges 96b to cut-off a predetermined length 10b of this strip. The frame 84′ is likewise provided with a slot 86′ for passing the tape-like strip 10 and further the transport rollers 88 and the guide element 90 are provided as in the embodiment described above. In lieu of the pushing means to inject the cut-off length of tape-like strip 10b, however, in this embodiment each hollow mold 4a is provided with a pair of synchronized transport rollers 22 penetrating the guide channel 18 and conveying rollers 104 and 106 mounted for each hollow mold 4a in the shaping apparatus 4. The conveying rollers 104 are mounted substantially in tangential relation with respect to the inner mold walls penetrating the latter. In order to correct the complete contour of the inner walls of hollow molds 4a the conveying rollers 104 have a respective recessing at their periphery, the drive means (not shown) for said conveying rollers 104 being designed in such a manner that upon termination of the introduction of the cut-off length of tape-like strip 10a into hollow molds 4a, in any case the position of the conveying rollers 104 shown in FIG. 6 will be maintained. The bores 4d for the transport rollers 104 in the shaping apparatus 4 have a somewhat greater diameter than the diameter of the conveying rollers 104 themselves so that a clearance 4c remains between the conveying rollers 104 and the respective bores 4d, said clearance somewhat exceeding the thickness of the strip 10a to be introduced into mold 4a. The openings 18a of guide channels 18 are positioned in front of the introduction slots 4b. These introduction slots 4b open tangentially into bores 4d and are oriented to the line of contact of the conveying rollers 104 and 106. Rollers 104 have a diameter exceeding that of roller 106. In order to engage the cut off length of tape-like strip 10a and to completely inject said length 10b into mold 4a the conveying rollers 104 are provided with radial perforations 104a communicating with axial bores 104d, the latter being connected to a source of reduced pressure (not shown). Further, a step 104b is provided on the periphery of conveying roller 104 which via tangential transition 104c is connected to the circumference of conveying roller 104.

OPERATION (EMBODIMENT 2)

In this embodiment the tape-like strips 10 will first be introduced by means of transport rollers 88 and 22, respectively, into guide channels 18 and thereafter cut to predetermined lengths by means of blade 96. This occurs as described above for the embodiment of FIGS.

1 to 5 during the time interval where the shaping apparatus 4 is in its uppermost position. The shaping apparatus 4 having returned into a lowermost position, the transport rollers 22 and conveying rollers 104, 106 are rotated by means of a suitable driving device (not shown) in such a manner that the cut-off length of tape-like strip 10a is injected into hollow mold 4a by means of rollers 22, 104 and 106, respectively. Due to the suction of the reduced pressure to which the perforations 104a subjected, the cut-off lengths 10b of the tape-like strips 10a are gripped at the periphery of conveying rollers 104 and are guided tangentially with respect to the circumference of the hollow mold inner walls. At the instance of the trailing edge of the cut-off length of tape-like strip 10b having passed the line of contact between conveying rollers 104 and 106 the strip length will preliminarily remain in this position because they have come out of contact with conveying rollers 104 and 106. Since, however, the conveying rollers 104 and 106 continue to revolve after a short time interval the steps 104b will engage behind the trailing edge at the cut-off length 10b and push the strip length as shown in FIG. 7 into hollow mold 4a until said step 104b will leave again the range of the periphery of hollow mold 4a, conveying roller 104 being brought to a standstill in the position shown in FIG. 6 such that its recessed area adapted to the mold contour be in the correct position. The injection of the cut-off length of tape-like strips 10b into hollow mold 4a thus is terminated and the shaping apparatus 4 will be brought to its uppermost position in order to implement the deformation of the heated thermoplastic film, and the entire sequence of operations as outlined above will be repeated.

In the embodiment according to FIGS. 6 and 7 there is no particular means to completely close the hollow molds 4a since the conveying rollers 104 with their recess complete the contour of mold 4a and the clearance between bore 4d and conveying roller 104 being so small that the mold 4a may be considered as substantially closed, the slots due to clearance 4c being in practice covered by the cut-off length of tape-like strip 10b.

It will be appreciated that an expert skilled in the art may readily provide modifications of the apparatus disclosed herein without departing from the scope of the invention, the latter being defined by the accompanying claims.

What I claim is:

1. In a cupping apparatus wherein cup-like containers are formed in a web of heated thermoplastic film, said containers having tape-like strips sealed to the outer side walls thereof, said apparatus comprising at least one mold element including a male portion and a female portion, each of said mold portions disposed on opposite sides of said heated web of thermoplastic film, means for intermittently advancing said film between said mold portions, means for displacing said female portion of said mold along a path transverse to the film between a first position wherein the female portion is separated from the male portion and a second position wherein the two mold portions mate to form a cup-like container in the film disposed therebetween and improved means for inserting said tape-like strip into said female mold portion such that the tape-like strip is positioned along the periphery of the inner wall of the female mold portion, which tape-like strip is sealed onto the outer side walls of the container formed upon mating of the male and female mold portions, the improvement comprising:
   a. a guide channel, the outlet end of which communicates with a mold passage means opening into the side wall of the female mold portion and the inlet end of which communicates with means for feeding a predetermined length of tape-like strip from a supply roll and into the guide channel when the female mold portion is in said second mating position;
   b. means adjacent the inlet end of the guide channel for cutting said tape-like strip from the supply roll after the tape-like strip is fed into the guide channel; and
   c. means for advancing the cut tape-like strip from the guide channel and inserting the tape-like strip into the female mold portion via said mold passage means when the female mold portion is in the first position.

2. The improvement of claim 1 wherein there is provided a plurality of molds each having a male portion and a female portion, each female portion of each mold being provided with tape-like strip insertion means.

3. The improvement of claim 1 wherein said tape-like strip advancing means comprises a mandrel reciprocally mounted in frame means opposite, with respect to said guide channel inlet, of said cutting means and a leafspring secured to said mandrel at one end and wound thereabout, the other or free end of the leafspring being thicker than the remainder of the leafspring such that an unwinding motion of the mandrel causes the thickened free end of the leafspring to be inserted into the inlet end of the guide channel, said free end engaging the rearward end of the tape-like strip disposed therein, whereby the tape-like strip is advanced by said leafspring from the guide channel through the mold passage means and into the mold.

4. The improvement of claim 1 wherein said tape-like strip advancing means comprises a pair of opposed conveying rollers adapted to engage said cut tape-like strip disposed in said guide channel and inject said strip into the female mold portion when said mold portion is in the first position, one of said rollers forming a continuation of the inner wall of said female mold portion when said mold portion is in the second position, said roller being further provided with means to engage the rear, trailing end of the tape-like strip.

5. The improvement of claim 1 in which said mold passage means comprising a reciprocable slider carrying slot closing member forming part of said mold in a first end position of said slider and being spaced from the remainder of the mold in the second end position of said slider, leaving said passage slot in alignment with said guide channel means outlet opening.

6. The improvement of claim 3 in which said leafspring is guided in a first slot of said frame means, said slot opening with one of its ends tangentially into a cylindrical cavity housing said mandrel and said spring when wound about said mandrel, the other end of said slot being provided with a counter-recess in which said thickened, strip engaging leafspring end is housed when would about said mandrel, a second slot extending substantially parallel to said first slot through said frame means and being fed with said tape-like strip at one of its ends, the other end of said second slot communicating with said channel means via funnel means which is movable between a first position in which it is aligned with said second slot and a second position in which it is aligned with said first slot, said funnel means being disposed between said cutting means and said channel means, the motion of said funnel means being synchronized with that of said cutting means.

7. The improvement of claim 4 in which additional transport rollers are provided which penetrate into said channel means to engage said length of strip and to feed it to said conveying rollers, and in which said one conveying roller is housed in a bore of said mold, the inner wall of said bore being spaced from said one conveying roller by a distance slightly exceeding the thickness of said strip.

8. The improvement of claim 4 in which said one conveying roller is provided with radial perforations adapted to be connected to a source of reduced pressure so to hold the length of strip adjacent its leading end.

9. The improvement of claim 4 in which said means to engage said trailing strip end comprises a step in the periphery of said one conveying roller.

10. The improvement of claim 4 in which said one conveying roller is provided with at least one radial perforation adapted to be connected to a source of reduced pressure and in which a step in the periphery of said one roller is provided to engage the trailing end of the cut-off length of strip, said one radial perforation being disposed in front of said step, seen in direction of rotation.

* * * * *